United States Patent
Talkowski

(12)
(10) Patent No.: US 6,399,684 B1
(45) Date of Patent: Jun. 4, 2002

(54) POLYMER-POLYAMIDE BLENDS HAVING A PHOSPHOROUS CONTAINING ADDITIVE

(75) Inventor: Charles John Talkowski, Hockessin, DE (US)

(73) Assignee: E. I. du Pont de Nemours & Company, Wilmington, DE (US)

( * ) Notice: Subject to any disclaimer, the term of this patent is extended or adjusted under 35 U.S.C. 154(b) by 0 days.

(21) Appl. No.: 09/377,560

(22) Filed: Aug. 19, 1999

Related U.S. Application Data
(60) Provisional application No. 60/097,992, filed on Aug. 26, 1998.

(51) Int. Cl.$^7$ .............................. C08K 3/32; C08K 5/49
(52) U.S. Cl. ................... 524/133; 524/136; 524/139; 524/414
(58) Field of Search ................... 524/133, 136, 524/139, 414

(56) References Cited

U.S. PATENT DOCUMENTS

| | | | |
|---|---|---|---|
| 2,234,566 A | 3/1941 | Lazier et al. ............... 260/464 |
| 2,241,321 A | 5/1941 | Schlack ........................ 260/2 |
| 2,249,177 A | 7/1941 | Schlack ..................... 260/239 |
| 2,970,997 A | 2/1961 | Fischer et al. ........... 260/239.3 |
| 3,000,877 A | 9/1961 | Phillips et al. ........... 260/239.3 |
| 3,000,878 A | 9/1961 | Phillips et al. ........... 260/239.3 |
| 3,000,879 A | 9/1961 | Phillips et al. ........... 260/239.3 |
| 3,016,375 A | 1/1962 | Hopkins et al. .......... 260/239.3 |
| 3,264,272 A | 8/1966 | Rees ......................... 260/78.5 |
| 3,676,400 A | 7/1972 | Kohan et al. ............. 260/857 L |
| 3,845,163 A | 10/1974 | Murch ..................... 260/857 L |
| 4,174,358 A | 11/1979 | Epstein ........................ 525/183 |
| 4,335,223 A | 6/1982 | Flood et al. ................. 525/179 |
| 4,351,931 A | 9/1982 | Armitage .................... 526/227 |
| 4,436,872 A | 3/1984 | Flood et al. ................. 525/179 |
| 4,594,382 A | 6/1986 | Hoenig et al. .............. 524/400 |
| 4,935,272 A | * 6/1990 | Leboeuf .................... 428/35.7 |
| 5,028,674 A | 7/1991 | Hatch et al. ................. 526/216 |
| 5,061,757 A | * 10/1991 | Warner ........................ 525/179 |
| 5,091,478 A | 2/1992 | Saltman ....................... 525/179 |
| 5,106,916 A | 4/1992 | Mitchell ..................... 525/255 |
| 5,156,775 A | 10/1992 | Blount ........................ 252/609 |
| 5,250,619 A | 10/1993 | Heinz et al. ................... 525/92 |
| 5,256,718 A | 10/1993 | Yamamoto et al. ......... 524/411 |
| 5,410,661 A | 4/1995 | Tamura ....................... 395/375 |
| 5,420,206 A | 5/1995 | Mason et al. ................ 525/179 |
| 5,451,642 A | 9/1995 | Abe et al. .................... 525/179 |
| 5,576,396 A | 11/1996 | Wang et al. ................. 525/367 |
| 5,631,328 A | 5/1997 | Wang et al. ............. 525/329.7 |
| 5,639,819 A | * 6/1997 | Farkas et al. ............... 524/606 |
| 5,688,868 A | 11/1997 | Fish, Jr. ...................... 525/183 |

FOREIGN PATENT DOCUMENTS

| EP | 315409 | 5/1989 |
| EP | 0574532 | 8/1996 |
| JP | 62059653 | 3/1987 |

OTHER PUBLICATIONS

Encyclopedia of Polymer Science and Technology, published by John Wiley & Sons, Inc., vol. 10, pp. 487–491, (1969).

* cited by examiner

*Primary Examiner*—Ana Woodward
(74) *Attorney, Agent, or Firm*—Kevin S. Dobson

(57) ABSTRACT

The present invention relates to polyamide/polymer blends having a morphology enhancing reagent selected from a phosphorous containing compound such as a hypophosphite salt. Significant physical effects are seen in Tensile strength as well as Vicat softening points. The blends having polyamide and a polymer selected from, for example, a neutralized ethylene copolymer, and the phosphorous containing reagent are useful in producing molded parts and other fabricated parts requiring high strength and toughness. Molded parts produced from such blends also have high gloss, high abrasion/scratch resistance and good high temperature properties.

17 Claims, No Drawings

POLYMER-POLYAMIDE BLENDS HAVING A PHOSPHOROUS CONTAINING ADDITIVE

This application claims the benefit of U.S. Provisional Application No. 60/097,992, filed Aug. 26, 1998.

BACKGROUND OF THE INVENTION

1. Field of the Invention

The present invention relates polymer/polyamide blend systems also having a morphology controlling reagent selected from a class of phosphorous containing compounds.

2. Description of Related Art

The inventor has previously found that certain blends of polyamides and neutralized ethylene acid copolymers provide compositions that are particularly useful in applications such as molded parts where a combination of toughness, high gloss, abrasion/scratch resistance, UV resistance, high temperature properties and stiffness are needed. These blends previously discovered specifically relate to compositions having 40 to 60 weight percent polyamide and 60 to 40 relative weight percent neutralized ethylene acid copolymer. The polyamide in these blends forms a continuous or co-continuous phase and the neutralized ethylene acid copolymer is dispersed there between in particle form. A multitude of other excipients, including thermal stabilizers such as organophosphorous compounds, were utilized in these compositions.

While these blends at the stated percentages achieve a balance of physical properties that are useful in molded parts applications, blends having less than 40 wt. % polyamide heretofore did not have an adequate balance of physical properties to provide useful compositions. This inventor has now found that the addition of phosphorous containing salts such as sodium hypophosphite ($NaH_2PO_2$) to a blend having less than 40 wt. % polyamide relative to a remaining portion of neutralized ethylene acid copolymer provides a composition with significantly enhanced morphological and mechanical properties. This discovery permits a broad spectrum of utility in molded part applications for polyamide/neutralized ethylene copolymer blends. In addition, the inventor has discovered that addition of the hypophosphite excipient to the blend also provides unexpected advantages to blends having 40% or greater polyamide relative to the neutralized alpha-olefin/alpha, beta-unsaturated carboxylic acid copolymer or terpolymer.

Heretofore, several prior art references have disclosed compositions or blends having both ethylene copolymers containing an unsaturated monocarboxylic acid and polyamides that are useful in a range of molding, coating or adhesive applications. For example, U.S. Pat. No. 5,091,478 teaches blends of thermoplastic resins including polyamides with ethylene copolymers including ethylene acid copolymers which may be neutralized with a metal ion along with a polymeric grafting agent selected from epoxides, isocyanates, aziridine, silanes, alkylating agents. These grafting reagents react with the acid-containing moieties of the ethylene acid copolymer and additionally react with a reactive graft site on the thermoplastic resin to form partially grafted flexible thermoplastic compositions having a specific quantity of reactive groups. There is no description in this disclosure of the use of a hypophosphite salt or phosphorous containing salt in the composition.

Similarly, EPO 574 532 B1 and the art cited therein discloses polyamide/ethylene copolymer blends. In particular, this reference discloses thermoplastic molding compositions having above zero to 50 wt. % of a polyamide; between 1 and 49 wt. % of at least one modified ethylene/propylene copolymer and between 1 and 49 wt. % of an ionomer of at least one olefinic acid copolymer having units derived from an alpha-olefin and an alpha, beta ethylenically unsaturated carboxlyic acid which is 10–100% neutralized. Again, as the in prior teaching, there is no disclosure or suggestion of the use of an inorganic phosphorous containing compound in the composition(s).

BRIEF SUMMARY OF THE INVENTION

The present invention broadly relates to a composition comprising or consisting essentially of a polyamide, a neutralized or partially neutralized alpha-olefin/alpha, beta unsaturated carboxylic acid copolymer or terpolymer or other neutralized acid-containing polymer or other polyamide polymer and an organic or inorganic phosphorous containing salt such as sodium, lithium or potassium hypophosphite ($MH_2PO_2$).

Additional polymeric or non-polymeric components may also be added to this composition. For example, the additional polymeric components may be selected from modified elastomeric copolymers such as those described in U.S. Pat. No. 5,420,206, hereby incorporated by reference. Suitable non-polymeric components include UV stabilizers, antioxidants, thermal stabilizers, processing aids, pigments and the like.

The present invention preferably comprises blends as described above having less than 40 wt. % polyamide relative to the neutralized ethylene copolymer. These blends, with the hypophosphite additive, provide significant enhancement to high temperature tensile strength and to Vicat softening points while retaining the properties associated with continuous or co-continuous polyamide domains with particles of neutralized ethylene copolymers dispersed there between.

DETAILED DESCRIPTION

As summarized above, the present invention relates to polyamide/ethylene copolymer blends having an additional morphological enhancing excipient. This morphology enhancing reagent permits blends having less than 40 wt. % polyamide relative to a neutralized alpha-olefin/alpha-beta-unsaturated carboxylic acid to retain the requisite physical and mechanical properties necessary for certain molded and fabricated parts. In addition, the morphology enhancing reagent enhances the physical properties of polyamide/alpha-olefin copolymer blends having 40 wt. % or greater polyamide.

The polyamide in the blends may be selected from semi-crystalline polyamides or blends of semi-crystalline polyamides and amorphous polyamides. The alpha-olefin based copolymer in the blends may be selected from copolymers having a carboxylic acid or derivative or precursor thereof as either part of the copolymer chain (e.g. in or within the backbone) or grafted onto the polymer or copolymer chain (e.g. grafted onto the backbone) or blends thereof. For example, an alpha-olefin such as ethylene can be copolymerized with an alpha, beta-unsaturated carboxylic acid such as acrylic acid or methacrylic acid and "neutralized", which in the present invention can mean either partial or complete neutralization of the acid moiety to form a metal salt of the acid-containing polymer, alternately referred to herein as a neutralized acid copolymer, a neutralized ethylene acid copolymer, a neutralized alpha-olefin based polymer, a neutralized acid-containing polymer, or more simply as a neutralized copolymer. This neutralized copolymer, having varying percentages of ethylene and the acid moiety or neutralized versions thereof, is then combined with the polyamide and the hypophosphite salt to form compositions of the invention.

Additionally, the alpha-olefin based polymer may be selected from, for example, EPDM that is grafted with a carboxyl containing molecule such as maleic anhydride or, for example, a non-metallocene or metallocene produced polymer or copolymer that is grafted with a polar carboxylic acid containing moiety. This grafted polymer is then blended with a polyamide and the hypophosphite salt to form a composition of the invention. Blends of grafted copolymers and copolymers having a carboxylic acid moiety in the polymer backbone chain may also be combined with a polyamide and a hypophosphite salt to form a composition of the invention. In all cases, the compositions are suitable for processing into fabricated parts such as molded automobile bumpers or the like. The preferred composition is selected from a blend of a semi-crystalline polyamide such as nylon-6, a neutralized ethylene acid copolymer and sodium hypophosphite.

The present invention particularly relates to compositions comprising blends of:

(a) 40 to 75 wt. % neutralized alpha-olefin based polymer and
(b) 60 to 25 wt. % polyamide based upon the combined weight of (a) plus (b) and
(c) a hypophosphite salt.

The preferred composition has less than 3 wt. % of component (c) based upon the combined weight of (a)+(b)+(c), with the most preferred percentages being less than one percent. The preferred neutralized alpha-olefin based polymer is a neutralized ethylene/methacrylic acid and the preferred polyamide is the semi-crystalline polyamide nylon 6.

The neutralized acid-containing-polymer, when selected from a neutralized ethylene/alpha,beta-unsaturated acid copolymer or terpolymer, is preferably present in a higher volume percent than the polyamide and is dispersed in the continuous or co-continuous polyamide phase. Preferably, the neutralized copolymer forms small particles that preferably are oblong and curvilinear or ellipsoid in shape in a co-continuous polyamide phase or are essentially spherical in a continuous polyamide phase. The average diameter of the essentially spherical particles (cross-sectional diameter or minor axis length of the oblong/ellipsoid particles) preferably is about 0.1 to about 0.2 micrometers ($\mu$m).

The addition of a hypophosphite salt or similar acting phosphorous containing salt provides enhanced Vicat softening points and enhanced tensile strengths to the polyamide/neutralized acid-containing-polymer blends and also broadens the weight percentage range of polyamides useful in these compositions. For example, the addition of a hypophosphite at levels of less than 1 wt. % permits use of less than 40 wt. % polyamide in polyamide/neutralized ethylene copolymer blends to about 30 wt. % polyamide. Previously, only 40% or greater (e.g. 40–60 wt. %) polyamide was suitable for these blends in order to retain or achieve good physical and morphological properties necessary for the end-use applications mentioned herein. Of course, for other applications like toughening compositions, the percentage of polyamide may increase from 60 to 98 wt. % relative to the additional polymeric component while also having the hypophosphite.

Polyamides

Polyamides suitable for use include the long chain polymeric amides having recurring amide groups as part of the polymer backbone and preferably, have a number average molecular weight as measured by end group titration of about 10,000 to 50,000. The polyamides suitable for use herein can be produced by any conventional means known to the art.

Polyamides include those which may be obtained by the polymerization of equimolar proportions of a diamine having two or more carbon atoms between the amine terminal groups with a dicarboxylic acid, or alternately that obtained by the polymerization of a monoamino carboxylic acid or an internal lactam thereof with an equimolar proportion of a diamine and a dicarboxylic acid. Further, suitable polyamides may be derived by the condensation of a monoaminocarboxylic acid or an internal lactam thereof having at least two carbon atoms between the amino and the carboxylic acid groups, as well as other means. General procedures useful for the preparation of polyamides are well known to the art, and the details of their formation are well described under the heading "Polyamides" in the Encyclopedia of Polymer Science and Technology, published by John Wiley & Sons, Inc, Vol. 10, pps.487–491, (1969).

Suitable diamines include those having the formula

H2N(CH2)nNH2 wherein n has an integer value of 1–16, and includes such compounds as trimethylenediamine, tetramethylenediamine, pentamethylenediamine, hexamethylenediamine, octamethylenediamine, decamethylenediamine, dodecamethylenediamine, hexadecamethylenediamine. Suitable diamines also include aromatic diamines such as p-phenylenediamine, 4,4'-diaminodiphenyl ether, 4,4'-diaminodiphenyl sulphone, 4,4'-diaminodiphenylmethane, alkylated diamines such as 2,2-dimethylpentamethylenediamine, 2,2,4-trimethylhexamethylenediamine, and 2,4,4-trimethylpentamethylenediamine, as well as cycloaliphatic diamines, such as diaminodicyclohexylmethane, and other compounds.

The dicarboxylic acids useful in the formation of polyamides are preferably those which are represented by the general formula

HOOC—Z—COOH wherein Z is representative of a divalent aliphatic radical containing at least 2 carbon atoms, such as adipic acid, sebacic acid, octadecanedioic acid, pimelic acid, subecic acid, azelaic acid, undecanedioic acid, and glutaric acid. The dicarboxylic acids may be aliphatic acids, or aromatic acids, such as isophtalic acid and terephthalic acid.

Suitable polyamides include: polypyrrolidone (nylon 4), polycaprolactam (nylon 6), polyheptolactam (nylon 7), polycaprylactam (nylon 8), polynonanolactam (nylon 9), polyundecaneolactam (nylon 11), polydodecanolactam (nylon 12), poly(tetramethylenediamine-co-oxalic acid) (nylon 4,2), poly(tetramethylenediamine-co-adipic acid) (nylon 4,6), poly(tetramethylenediamine-co-isophthalic acid) (nylon 4,I), polyhexamethylene azelaiamide (nylon 6,9), polyhexamethylene sebacamide (nylon 6,10), polyhexamethylene isophthalamide (nylon 6,IP), polymetaxyllylene adipamide (nylon MSD:6), the polyamide of n-dodecanedioic acid and hexamethylenediamine (nylon 6,12), the polyamide of dodecamethylenediamine and n-dodecanedioic acid (nylon 12,12), as well as copolymers thereof which include: hexamethylene adipamide-caprolactam (nylon 6,6/6), hexamethylene adipamide/hexamethylene-isophthalamide (nylon 6,6/6IP), hexamethylene adipamide/hexamethyleneterephthalamide (nylon 6,6/6T), trimethylene adipamide-hexamethylene-azelaiamide (nylon trimethyl 6,2/6,2), and hexamethylene adipamide-hexamethylene-azelaiamide caprolactam (nylon 6,6/6,9/6) as well as others which are not particularly delineated here.

Of these polyamides, preferred polyamides include polycaprolactam, which is also commonly referred to as nylon 6 and mixtures of nylon 6 with other polyamides including amorphous polyamides.

The synthesis of nylon 6 may proceed from epsilon - minocaproic acid which, upon heating with water, produces nylon 6, as is disclosed in U.S. Pat. No. 2,241,321 to P. Schlack. Other suitable methods are well known to the art and include those described in U.S. Pat. Nos. 2,234,566; 2,249,177; 2,970,997; 3,000,877; 3,000,878; 3,000,879; 3,016,375 as well as others. Polyamides such as nylon 6 and nylon 6,6 may comprise a variety of terminal functionalities that include the preferred terminal functionalities of, a carboxyl group as both terminal groups in the polyamide chain, a carboxyl group attached to one end of the polyamide chain, and an amide group attached to the other end of the polyamide chain, an amino group attached to both ends of the polyamide chain, and a carboxyl group attached to one end and one amino group attached to the other end of the polyamide chain. Monocarboxylic acids or dicarboxylic acids, including acetic acid, azelaic acid, or sebacic acid can be used to terminate the polyamide chain. Preferred polyamides feature an equal number of amine groups to acid groups, (also referred to as "balanced" end groups) as well as those which feature a preponderance of amine groups to acid groups.

In preferred embodiments the nylon 6, nylon 6,6 or blends thereof feature a number average molecular weight of between about 10,000 and about 50,000; preferably between about 15,000 and about 40,000; most preferably between about 15,000 and 20,000. The basis for this particular order of preferences is based on observations that the mechanical properties improve rapidly with increasing numerical average molecular weight to about 20,000 and processing becomes more difficult when the number average molecular weight approaches and/or exceeds about 30,000.

Semi-crystalline polyamides suitable for this invention are generally prepared from lactams or amino acids or from condensation of diamines such as hexamethylene diamine with dibasic acids such as sebacic acid. Copolymers and terpolymers of these polyamides are also included. Preferred semi-crystalline polyamides are polyepsiloncaprolactam (nylon-6), polyhexamethylene adipamide (nylon-66), most preferably nylon-6. Other semi-crystalline polyamides useful in the present invention include nylon-11, nylon-12, nylon-12,12 and copolymers and terpolymers such as nylon-6/66, nylon-6/610, nylon-6/12, nylon-66/12, nylon-6/66/610 and nylon-6/6T.

Amorphous polyamides can be substituted for some of the semi-crystalline polyamide to raise the glass transition temperature (Tg) of the nylon phase. Up to about 10 wt. %, preferably up to about 5 wt. %, of the polyamide phase can be amorphous polyamides. The term "amorphous polyamide" is well known to those skilled in the art. "Amorphous polyamide," as used herein, refers to those polyamides which are lacking in crystallinity as shown by the lack of an endotherm crystalline melting peak in a Differential Scanning Calorimeter ("DSC") measurement (ASTM D-3417), 10° C./minute heating rate.

Examples of the amorphous polyamides that can be used include hexamethylenediamine isophthalamide, hexamethylenediamine isophthalamide/terephthalamide terpolymer, having iso-terephthalic moiety ratios of 100/0 to 60/40, mixtures of 2,2,4- and 2,4,4-trimethylhexamethylenediamine terephthalamide, copolymers of hexamethylene diamine and 2-methylpentamethylenediame with iso-or terephthalic acids, or mixtures of these acids. Polyamides based on hexamethylenediamine iso/terephthalamide containing high levels of terephthalic acid moiety may also be useful provided a second diamine such as 2-methyldiaminopentane is incorporated to produce a processible amorphous polymer. Amorphous polyamides may contain, as comonomers, minor amounts of lactam species such as caprolactam or lauryl lactam, even though polymers based on these monomers alone are not amorphous as long as they do not impart crystallinity to the polyamide. In addition, up to about 10 wt. % of a liquid or solid plasticizer such as glycerol, sorbitol, mannitol, or aromatic sulfonamide compounds (such as "Santicizer 8" from Monsanto) may be included with the amorphous polyamide.

The amorphous polyamide may be a blend of ethylene vinyl alcohol and amorphous nylon in which the polyamide component comprises about 5 to about 95 wt. % of the total composition of EVOH plus polyamide, preferably about 15 to about 70 wt. %, and most preferably about 15 to about 30 wt. %.

The polyamide component should have a viscosity under melt-blend conditions that is high enough to provide the mechanical properties but low enough to create the phase relationship of this invention. The viscosity of the polyamide should be higher than that of the ethylene-acid copolymer or ionomer at low neutralization levels, but should be less than the ionomer at high neutralization levels.

Additional Polymeric Component

The additional polymeric component added to the polyamide to form compositions of the invention is selected from a wide class of suitable polymeric compounds. This "class" is primarily based upon ethylene containing polymers that also have additional monomers selected from, for example, alpha-olefins, alpha,beta-unsaturated carboxylic acids or derivatives thereof as well as others identified below. It can also include a second or different polyamide than the first polyamide to form, when combined with a polyamide selected from above, a blend of different polyamides wherein one of the distinct polyamides forms a continuous or co-continuous phase. The preferred additional polymeric components are selected from neutralized ethylene acid containing copolymers or terpolymers.

The neutralized acid-containing polymers of the present invention may, for example, be derived from direct copolymers of an alpha-olefin such as ethylene and an $\alpha,\beta$-ethylenically-unsaturated $C_3$–$C_8$ carboxylic acid ("ethylene-acid copolymers") by neutralization with metal ions. By "direct copolymer", it is meant that the copolymer is made by polymerization of monomers together at the same time, as distinct from a "graft copolymer" where a monomer is attached or polymerized onto an existing polymer chain. Methods of preparing such neutralized ethylene-acid copolymers are well known and are described in U.S. Pat. No. 3,264,272 which is herein incorporated by reference. Preparation of the direct ethylene-acid copolymers on which the neutralized species are based is described in U.S. Pat. No. 4,351,931 which is also incorporated by reference herein.

Ethylene-acid copolymers with high levels of acid are difficult to prepare in continuous polymerizers because of monomer-polymer phase separation. This difficulty can be avoided however by use of "cosolvent technology" as described in U.S. Pat. No. 5,028,674 which is also incorporated herein by reference or by employing somewhat higher pressures than those at which copolymers with lower acid can be prepared.

The ethylene-acid copolymers used to make the neutralized copolymer of this invention can be E/X/Y and/or E/Y copolymers where E is ethylene; X is a softening comonomer and Y is the $\alpha,\beta$-ethylenically-unsaturated $C_3$–$C_8$ carboxylic acid, particularly acrylic or methacrylic acid. Preferably, however, the ethylene-acid copolymer is a dipolymer (no softening comonomer). The preferred acid moieties are methacrylic acid and acrylic acid.

By "softening", it is meant that the polymer is made less crystalline. Suitable "softening" comonomers (X) are monomers selected from alkyl acrylate, and alkyl methacrylate, wherein the alkyl groups have from 1–12 carbon atoms which, when present, may be up to 30 (preferably up to 25, most preferably up to 15) wt. % of the ethylene-acid copolymer.

Preferred ethylene-acid dipolymers are ethylene/acrylic acid and ethylene/methacrylic acid. Specific other copolymers include ethylene/n-butyl acrylate/acrylic acid, ethylene/n-butyl acrylate/methacrylic acid, ethylene/iso-butyl acrylate/methacrylic acid, ethylene/iso-butyl acrylate/acrylic acid, ethylene/n-butyl methacrylate/methacrylic acid, ethylene/methyl methacrylate/acrylic acid, ethylene/methyl acrylate/acrylic acid, ethylene/methyl acrylate/methacrylic acid, ethylene/methyl methacrylate/methacrylic acid, and ethylene/n-butyl methacrylate/acrylic acid.

The ethylene-acid copolymers used to make the neutralized copolymers of this invention have the acid moiety present in a high amount. The amount that will be considered as "high" will depend on which acid moiety is employed, particularly the molecular weight of the acid moiety. In the case of ethylene/methacrylic acid, the preferred acid level is 15 to 25, (preferably 18 to 25, more preferably 19 to 22) wt. % of the copolymer. In the case of ethylene/acrylic acid, the preferred acid level is 14 to 25, (preferably 16 to 25, more preferably 18 to 22) wt. % of the copolymer. "High acid" is generally desired to obtain good gloss levels and abrasion resistance.

It will be recognized that it is possible to blend more than one copolymer, the acid level of any one or more being outside the "high" range of the invention, to obtain an average acid level prior to neutralization that is within the preferred high percentage acid levels. Preferably, in the case of blends, the weight percent acid in each acid copolymer from which the ionomer components are derived should be close to the preferred range, and most preferably they should be within this range.

The acid moiety is preferably highly neutralized with metal cations, particularly monovalent and/or bivalent metal cations. It is preferable to neutralize with metal cations that are compatible with the polyamide, that is, with cations that also interact with the amide links of the polyamide. Preferred metal cations for the carboxylic acid moieties include lithium, magnesium, calcium, and zinc, or a combination of such cations. Zinc is most preferred. Potassium and sodium are generally not as suitable. Potassium-neutralized ethylene/acid copolymers tend to absorb water adversely effecting the nylon. Sodium neutralized compounds are difficult to stabilize to UV radiation. Magnesium and calcium preferably are used in combination with zinc.

While the neutralizing agent (e.g., zinc oxide, magnesium oxide, and calcium oxide) can be added in solid form, it preferably is added as a concentrate in an ethylene-acid copolymer carrier. This concentrate is made by carefully selecting the ethylene-acid copolymer and the blending conditions to assure that the neutralizing agent does not significantly neutralize the carrier. This neutralizing concentrate can also contain small amounts (up to about 2 wt. %) of one or more salts of the metal cations (e.g. acetates and stearates).

A multitude of suitable neutralized ethylene copolymers are commercially available from suppliers such as E.I. DuPont de Nemours and Company of Wilmington, Del. For example, resins sold under the trademark SURLYN® along with a particular numeral designation are useful including without limitation SURLYN®9120, SURLYN®9220, SURLYN®9520, SURLYN®9320, SURLYN®9020 or blends thereof. Other supplier resins such as those sold by Exxon under the trademark IOTEK® are also suitable. Blends of SURLYN® resins and IOTEK® resins are suitable as well. The physical properties of the blend will vary depending upon the acid-content in the pre-neutralized acid-containing resin. High acid percentage is preferred.

Additional acid-containing polymers that may be blended with a polyamide and a hypophosphite include, for example, include those non-polyamide components contained in toughened multiphase compositions comprising a polyamide matrix resin and at least one other polymer chosen from those listed in U.S. Pat. No. 4,174,358 ("Epstein"), hereby incorporated by reference. In this case, the acid-containing polymers described therein do not have to be neutralized yet are encompassed within the scope of this invention.

The composition further comprises a) a polyamide; b) an additional polymer and c) a hypophosphite salt wherein addition of the hypophosphite salt improves the morphology or physical properties of the blend. This "improvement" relates to increasing the Vicat softening point and the tensile properties of the blend and, preferably occurs with blends having component b) as an acid-containing polymer. Vicat values are improved, in the case of polyamide/neutralized ethylene acid/hypophosphite blends from about +40 to about +100° C. as the delta or change from the Vicat temperature value without the added hypophosphite. High temperature tensile is improved by about 4 to about 10 times relative to the non-hypophosphite containing polyamide blend.

In particular, the "additional polymer" is selected from branched and straight-chain polymers represented by the formula:

A(a)–B(b)–C(c)–D(d)–E(e)–F(f)–G(g)–H(h) derived in any order from monomers A–H where A is ethylene;

B is carbon monoxide;

C is an unsaturated monomer taken from the class consisting of alpha,beta-ethyleneically unsaturated carboxylic acids having from 3 to 8 carbon atoms, and derivatives thereof taken from the class consisting of monoesters of alcohols of 1 to 29 carbon atoms and the dicarboxylic acids and anhydrides of the dicarboxylic acids and the metal salts of the monocarboxylic, dicarboxylic acids and the monoester of the dicarboxylic acid having from 0 to 100 percent of the carboxylic acid groups ionized by neutralization with metal ions;

D is an unsaturated epoxide of 4 to 11 carbon atoms;

E is the residue derived by the loss of nitrogen from an aromatic sulfonyl azide substituted by carboxylic acids taken from the class consisting of mono-carboxylic and dicarboxylic acids having from 7 to 12 carbon atoms and derivatives thereof taken from the class consisting of monoesters of alcohols of 1 to 29 carbon atoms and the dicarboxylic acids and anhydrides of the dicarboxylic acids and the metal salts of the monocarboxylic, dicarboxylic acids and the monoester of the dicarboxylic acid having from 0 to 100 percent of the carboxylic acid groups ionized by neutralization with metal ions;

F is an unsaturated monomer taken from the class consisting of acrylate esters having from 4 to 22 carbon atoms, vinyl esters of acids having from 1 to 20 carbon atoms (substantially no residual acid), vinyl ethers of 3 to 20 carbon atoms, and vinyl and vinylidene halides, and nitriles having from 3 to 6 carbon atoms;

G is an unsaturated monomer having pendant hydrocarbon chains of 1 to 12 carbon atoms capable of being grafted with monomers having at least one reactive group of the type defined in C, D and E, and pendant aromatic groups, which may have 1 to 6 substituent groups having a total of 14 carbon atoms; and H is an unsaturated monomer taken from the class consisting of branched, straight chain and cyclic compounds having from 4 to 14 carbon atoms and at least one additional nonconjugated unsaturated carbon-carbon bond capable of being grafted with a monomer having at least one reactive group of the type defined in C, D and E. The mole fractions for each monomer may be (a) 0–0.95; (b) 0–0.3; (c) 0–0.5; (d) 0–0.5; (e) 0–0.5; (f) 0–0.99; (g) 0–0.99; and that the total of all components is a mole fraction of 1.0.

Specific polymers within the above designations are further described in Epstein. In addition, the neutralized ethylene acid copolymers are within the generic description described above but are particularly useful in blend compositions having less than 40 wt. % polyamide. Most of the additional polymers described above or delineated in Epstein are useful in polyamide blend compositions wherein the polyamide component is present in at least 60 wt. % (e.g. 70, 80 or 90%). The morphology enhancing effects of the hypophosphite salts will probably be less significant at these higher polyamide percentages even though the compositions would still be suitable for specific uses.

A further constituent which may be used in the inventive compositions are modified or unmodified elastomeric polymers, also interchangeably referred to herein and in the art as elastomers or rubbery polymers. Such useful elastomeric polymers which may be subsequently modified include a copolymer of ethylene and an alpha-olefin other than ethylene. The alpha-olefin preferably is an alpha-olefin selected from at least one C3–C8, and preferably is an alpha-olefin selected from at least one C3–C6 alpha-olefin. Propylene is a preferred monomer selected as the C3–C8 alpha-olefin copolymer. Other C3–C6 alpha-olefins which find use in conjunction with the composition include 1-butene, 1-pentene, and 1-hexene can be used in place of or in addition to propylene in the copolymers.

The copolymer has an average of at least two, preferably from 2 to 10, more preferably 2 to 6, and most preferably 2 to 4 reactive moieties per copolymer molecule which is preferably grafted to the copolymer. It is believed that the greater than one reactive moiety groups on the reactive copolymer enhances the networking between the amine end groups of the polyamide and the reactive copolymer. The reactive moiety may be a carboxyl or carboxylate functionality, which can be supplied by reacting the ethylene/C3–C6 alpha-olefin copolymer with an unsaturated reactive moiety taken from the class consisting of alpha, beta-ethylenically unsaturated dicarboxylic acids having from 4 to 8 carbon atoms, or derivatives thereof; such derivatives include anhydrides of the dicarboxylic acids, or the metal salts of the acids, or the monoester of the dicarboxylic acid having from 0 to 100 percent of the carboxylic acid groups ionized by neutralization with metal basic salt and the like. Illustrative of such acids and derivatives are: maleic acid, maleic anhydride, maleic acid monoethyl ester, metal salts of maleic acid monoethyl ester, fumaric acid, fumaric acid monoethyl ester, itaconic acid or vinyl phthalic acid metal salts of fumaric acid monoethyl ester. If an acid-modified graft copolymer is utilized herein, the grafting level or percentage should be sufficiently high in order to achieve maximal and suitable physical properties when utilized as the sole acid containing polymer. If an acid modified graft copolymer is used in a blend with a neutralized ethylene copolymer, the percentage of acid on the modified copolymer can be less. This balance with evaluation of resultant physical properties in the ultimate polyamide blend is within the purview of one of ordinary skill in the art given the teachings herein.

Hypophosphite Salts

The addition of a phosphorous-containing-compound, a hypophosphite salt (in organic or inorganic form), provides significant morphological and property enhancements to blends of polyamides with acid-containing copolymers. The phosphorous-containing-compounds utilized herein are selected from a compound of the formula: R1R2P(O)OH and salts thereof wherein R1 and R2 are independently selected from hydrogen or an organic radical having 1–16 carbon atoms. The metal salts are selected from sodium, potassium or lithium. The preferred compound is selected from HHP(O)ONa or NaH2PO2.

The above preferred phosphorous compounds are selected from the class of phosphorous acids and their salts. Included in this class are oxo acids with the general formula H3POn (ortho acids) and HPOn-1(meta form) and the diacids with the general formula H4P2On (n=4–8) which have varying oxidation states as presented in the following Table (Table 1).

TABLE 1

| | Acids of type H3POn and HPOn-1 | | | | Acids of type H4P2On | | |
|---|---|---|---|---|---|---|---|
| Oxidation State | Formula ortho | Formula meta | Name | Salts | Formula | Name | Salts |
| +1 | H3PO2 | | phosphinic acid, hypophosphorous acid, phosphoric (I) acid | hypophosphites, phosphates (I) | | | |

TABLE 1-continued

Acids of type H3POn and HPOn-1 / Acids of type H4P2On

| Oxidation State | Formula ortho | Formula meta | Name | Salts | Formula | Name | Salts |
|---|---|---|---|---|---|---|---|
| +2 | | | | | H4P2O4 | hypodiphosphonic acid, diphosphoric (II) acid | hypodiphosphites, diphosphates (II) |
| +3 | H3PO3 | HPO2 | phosphonic acid, phosphorous acid, phosphoric (III) acid | phosphites, phosphates (III) | H4P2O5 | diphosphonic acid, diphosphoric (III) acid | diphosphites, diphosphates (III) |
| +4 | | | | | H4P2O6 | hypodiphosphoric acid, diphosphoric (IV) acid | hypodiphosphates, diphosphates (IV) |
| +5 | H3PO4 | HPO3 | phosphoric acid, phosphoric (V) acid | phosphates, phosphates (V) | H4P2O7 | diphosphoric acid, pyrophosphoric acid, diphosphoric (V) acid | diphosphates, diphosphates (V) |

In aqueous solution, the anions of phosphinic, phosphonic, and phosphoric acids are known as phosphate (PO4)3-, phosphite (HPO3)2- and hypophosphite (H2PO2) 1-. The hypophosphite (phosphinite) anion is monobasic and is the preferred anion which is neutralized by a metal cation in the present invention. The other anions and their salts are suitable as well provided that the morphological properties of the polyamide/polymer blends are enhanced compared to the same blends without the phosphorous containing compound. In addition to the simple anions mentioned above, there are many polyphosphoric acids with the general formula Hn+2PnO3n+1 with three or more phosphorous atoms in the molecule that contain P—O—P bonds and acids that contain P—P bonds which are also suitable herein. For example, diphosphonic acid or H4P2O5 with the anion [HPO2O—PO2H]-2 or diphosphoric acid or pyrophosphoric acid H4P2O7 with the anion [OPO2OPO2O]4 are suitable as well. As suggested above, the counterions may be selected from any suitable metal counterion having a balancing charge such as lithium, sodium, potassium, magnesium, calcium, zinc or others as indicated on the periodic table of the elements. The preferred metal in the case of a hypophosphite is sodium.

Other Components

Additives normally compounded into plastics may be included in the blend, for example, UV stabilizers, antioxidants and thermal stabilizers, processing aids, pigments and the like. When included, these components are preferably present in amounts of about 1 to about 3 (preferably about 1.5 to about 3) parts per hundred parts by weight of the ionomer/polyamide blend but may be present in lower or higher amounts.

Of particular importance if the part is to be exposed to ultraviolet (UV) light is the inclusion of one or more UV stabilizers for the nylon and for the ionomer. Typically useful UV stabilizers include: benzophenones such as hydroxy dodecyloxy benzophenone, 2,4-dihydroxybenzophenone, hydroxybenzophenones containing sulfonic groups and the like; triazoles such as 2-phenyl-4-(2',2'-dihydroxylbenzoyl)-triazoles; substituted benzothiazoles such as hydroxy-phenylthiazoles and the like; triazines such as 3,5-dialkyl-4-hydroxyphenyl derivatives of triazine, sulfur containing derivatives of dialkyl-4-hydroxy phenyl triazines, hydroxy phenyl-1,3,5-triazine and the like; benzoates such as dibenzoate of diphenylol propane, tertiary butyl benzoate of diphenylol propane and the like; and others such as lower alkyl thiomethylene containing phenols, substituted benzenes such as 1,3-bis-(2'-hydroxybenzoyl)benzene, metal derivatives of 3,5-di-t-butyl-4-hydroxy phenyl proprionic acid, asymmetrical oxalic acid, diarylamides, alkylhydroxy-phenyl-thioalkanoic acid ester, and hindered amines of bipiperidyl derivatives.

Preferred UV stabilizers, all available from Ciba Geigy, are TINUVIN®234 (2-(2H-benzotriazol-2-yl)-4,6-bis(1-methyl-1-phenylethyl)phenol), TINUVIN®327 (2-(3',5'-di-tert-butyl-2'-hydroxyphenyl)-5 chlorobenzotriazole), TINUVIN®328 (2-(2'hydroxy-3',5'-di-tert-amylphenyl) benzotriazole), TINUVIN®329 (2-(2'-hydroxy-5'-tert-octylphenyl)benzotriazole), TINUVIN®765 (bis(1,2,2,6,6-pentamethyl-4-piperidinyl)sebacate),TINUVIN®770 (bis (2,2,6,6-tetramethyl-4-piperidinyl)decanedioate), and CHIMASSORB™944 (N,N'-bis(2,2,6,6-tetramethyl-4-piperidinyl)-1,6-hexanediamine polymer with 2,4,6-trichloro-1,3,5-triazine and 2,4,4-trimethyl-1,2-pentanamine).

Preferred thermal stabilizers, all available from Ciba Geigy, are IRGANOX®259 (hexamethylene bis(3,5-di-tert-butyl-4-hydroxyhydrocinnamate), IRGANOX®1010 (3,5-bis(1,1 -dimethylethyl)-4-hyroxybenzenepropanoic acid, 2,2-bis[[3-[3,5-bis(1,1-dimethylethyl)-4-hydroxyphenyl]-1-oxopropoxy]methyl]1,3-propanediyl ester), IRGANOX®1076 (octadecyl 3,5-di-tert-butyl-4-hydroxyhydrocinnamate), Iragnox®1098 (N,N'-hexamethylene bis(3,5-di-tert-butyl-4-hydroxyhydrocinnamide), IRGANOX®B215 (33/67 blend of IRGANOX®1010 with tris(2,4-di-tert-butylphenyl)phosphite), IRGANOX®B225 (50/50 blend of IRGANOX®1010 with tris(2,4-di-tert-butylphenyl) phosphite), and IRGANOX®B 1171 (50/50 blend of IRGANOX®1098 with tris(2,4-di-tert-butylphenyl)phosphite).

Preferred processing aids include aluminum distearate and zinc stearate, particularly zinc stearate.

Pigments include both clear pigments such as inorganic siliceous pigments (silica pigments for example) and conventional pigments used in coating compositions. Conventional pigments include metallic oxides such as titanium dioxide, and iron oxide; metal hydroxides; metal flakes such as aluminum flake; chromates such as lead chromate; sulfides; sulfates; carbonates; carbon black; silica; talc; china clay; phthalocyanine blues and greens, organo reds; organo maroons and other organic pigments and dyes. Particularly preferred are pigments that are stable at high temperatures.

Pigments are generally formulated into a millbase by mixing the pigments with a dispersing resin which may be the same as or compatible with the material into which the pigment is to be incorporated. Pigment dispersions are formed by conventional means such as sand grinding, ball milling, attritor grinding or two-roll milling.

Other additives, while not generally needed or used, such as fiber glass and mineral fillers, anti-slip agents, plasticizers, nucleating agents, and the like, can be incorporated.

Methods of Manufacture

In order to obtain the desired morphology and desired properties of the blends, it is generally necessary to secure a neutralized acid copolymer, preferably highly neutralized, in a continuous or co-continuous polyamide phase even when the volume percent of the ethylene acid is greater than that of the polyamide. The preferred compositions in this invention actually have less than 40 wt. % polyamide relative to the neutralized acid ethylene copolymer. The hypophosphite morphology enhancing reagent actually permits the relative weight percentage of polyamide to go less than 40% while also retaining good morphological properties associated with a neutralized acid in a continuous or co-continuous polyamide phase.

To achieve the desired morphology, the ethylene-acid copolymer, preferably partially neutralized with a cation that is compatible with the nylon, and the polyamide should be melt blended under intensive mixing conditions (high shear) with further neutralization as the blending occurs. Mixing should be at an intensity, temperature and residence time sufficient to get the desired morphology. An efficient devolatilization system is needed to remove water that is formed during the neutralization process. Devolatilization efficiency is more important if starting at low or no neutralization since more water will be formed. Preferably there should be at least one vacuum zone in the melt compounding with at least 630 mm Hg vacuum applied to remove moisture.

The various starting ingredients may first be combined with one another in what is commonly referred to as a "salt and pepper" blend. They may also be combined by simultaneous or separate metering or they may be divided and blended in one or more passes into one or more mixing sections of mixing equipment such as extruders, Banbury mixers, Buss Kneaders, Ferrell continuous mixers or the like. If more than one feed zone is available, the nylon, the neutralizing agent preferably as a concentrate, and some of the ionomer may be added at the rear most feed port with the remainder of the ionomer being added in a later feed zone. The polymer strands exiting the extruder are preferably quenched in a water bath prior to cutting into pellets. Alternative methods well recognized by one skilled in the art for pelletizing including underwater cutting and air quenching can be used.

Preferred equipment for mixing is equipment such as employed in the examples, particularly a twin screw extruder optionally equipped with a static mixer such as sold by Kenics Company located between the extruder screws and the die. The extruder used in the examples preferably is run at a screw speed of 175 to 250 rpm. The sections of bushings comprise feed sections, kneading block mixing (reaction) sections, a vacuum extraction section with reverse pitch screws, and a die section.

Preferably, the mixing and the degree of neutralization should be sufficient to bring about the phase inversion (higher volume percent ionomer dispersed in the continuous or co-continuous nylon phase) in the mixing equipment. It should be recognized, however, that full inversion may not occur in the mixing equipment but may result from further working of the blend in injection molding operations for forming plaques and the like.

Suitable high percentage polyamide blends-e.g., greater than or equal to 40 wt. % polyamide include blends having the compositions delineated below along 30 with 2 wt. % or less phosphorous compound (e.g. sodium hypophosphite). In the blends described below, neutralization with Zn or with ZnO refers to a process wherein acid polymers are neutralized with a ZnO concentrate, the concentrate being further described in the Examples. Suitable blends include:

1) 49.8 wt. % nylon-6, 48.6 wt. % SURLYN®9220 (ethylene methacrylic acid 20% (E/20% MAA) neutralized to a 34% Zn salt content) further neutralized to about 75% with zinc, and 1.6 wt. % Additive and Stabilizer package;
2) same as blend 1 above with additional neutralization by 4 wt. % ZnO;
3) same as blend B1 except SURLYN®9220 was neutralized to 67% with zinc;
4) SURLYN®9220 was neutralized to 72% with zinc, and 40 wt. % of this combined with 55 wt. % nylon-6 and 1.3 wt. % stabilizer package, and further neutralization of the blend to about 100% with 3.7 wt. % ZnO;
5) 40 wt. % of the 72% neutralized SURLYN®9220 of blend 4; 50 wt. % nylon-6; 5 wt. % SELAR®PA (6-isophthalic/6-terephthalic) amorphous nylon; 3.7 wt. % ZnO concentrate and 1.3 wt. % stabilizer package;
6) 35 wt. % of the 72% neutralized SURLYN®9220 of blend 4 above; 55 wt. % nylon-6; 5 wt. % SELAR®PA; 3.7 wt. % ZnO concentrate and 1.3 wt. % stabilizer package;
7) 55 wt. % nylon-6; 37 wt. % E/20% MAA neutralized with Mg2+ to about 40% Mg salt content; and 1.3 wt. % stabilizer package, the blend further neutralized with 6.7 wt. % of 30% ZnO concentrate to about 100% neutralization;
8) 37.2 wt. % SURLYN®9220; 54 wt. % nylon-6 and 1.3 wt. % stabilizer package neutralized to about 100% with 7.5 wt. % 30% ZnO;
9) 46 wt. % nylon-6, 43.6 wt. % SURLYN® 9120 (ethylene/methacrylic acid 19 wt. % neutralized with 38% Zn, and 1.8 wt. % stabilizer package further neutralized with 8.6 wt. % of 30% ZnO concentrate to about 97% neutralization;
10) 43 wt. % nylon-6, 46.05 wt. % SURLYN®9120, and 1.8 wt. % stabilizer package further neutralized with 8.6 wt. % 30% ZnO concentrate and 0.55% CaO powder to about 100% neutralization;
11) 40 wt. % nylon-6, 48.95 wt. % SURLYN®9120, and 1.8 wt. % stabilizer package further neutralized with 8.7% ZnO concentrate and 0.55 wt. % CaO powder to about 100% neutralization;

12) 46 wt. % nylon-6, 49.6 wt. % SURLYN®9520 (E/10 wt. % MAA neutralized with zinc to 72% neutralization), and 1.8 wt. % stabilizer package further mixed with 2.6 wt. % of 30% ZnO concentrate to about 100% neutralization;

13) 45 wt. % nylon-6, 50.7 wt. % SURLYN® 9320 (E/24 wt. % nBA/about 10 wt. % MAA; 67% zinc neutralized); and 1.8 wt. % stabilizer package further neutralized with 2.5 wt. % of 30% ZnO concentrate to about 95% neutralization;

14) 45 wt. % nylon-6, 25.4 wt. % SURLYN® 9320 plus 25.3 wt. % SURLYN® 9520 and 1.8 wt. % stabilizer package further neutralized with 2.5 wt. % of 30% ZnO concentrate to about 95% neutralization;

15) 45 wt. % nylon-6, 25.2 wt. % SURLYN® 9320 plus 25.3 wt. % SURLYN® 9520 and 1.8 wt. % stabilizer package further neutralized with 2.5 wt. % of 30% ZnO and 0.2 wt. % CaO to about 100% neutralization;

16) 45 wt. % nylon 6 and 50.7 wt. % SURLYN® 9020 (E/10 wt. % iBA/10 wt. % MAA, 73% neutralized) and 1.8 wt. % stabilizer package further neutralized with 2.5 wt. % of 30% ZnO concentrate to about 95% neutralization;

17) 45 wt. % nylon 6, 25.2 wt. % SURLYN® 9520 and 22.3 wt. % high acid SURLYN® 9120 and 1.8 wt. % stabilizer package further neutralized with 5.7 wt. % of 30% ZnO concentrate to about 97% neutralization;

18) 45 wt. % nylon-6, 25.2 wt. % SURLYN® 9320 and 22.3 wt. % SURLYN® 9120 and 1.8 wt. % stabilizer package further neutralized with 5.7 wt. % of 30% ZnO concentrate to about 97% neutralization;

19) 45 wt. % nylon 6, and 44.2 wt. % SURLYN® 9120, 1.8 wt. % stabilizer package and 0.5% zinc stearate further neutralized with 8.5 wt. % of 30% ZnO concentrate to about 93% neutralization;

20) 44 wt. % ULTRAMID® nylon 6, 45.7 wt. % SURLYN® 9120 and 1.9 wt. % stabilizer package and 0.5 wt. % zinc stearate further neutralized with 7.4 wt. % of 30% ZnO concentrate to about 88% neutralization;

21) 44 wt. % ULTRAMID® nylon-6, 46.9 wt. % SURLYN® 9120 and 1.9 wt. % stabilizer package and 1.0 wt. % zinc stearate further neutralized with 6.2 wt. % of 30% ZnO to about 80% neutralization.

Blends having less than 40 wt. % polyamide are exemplified in the examples section of this specification and can include all the processing aids and neutralized ethylene copolymers or copolymer blends as described above in larger relative percentages. Similarly, blends having more polyamide than described above and less neutralized ethylene copolymer or copolymer blends are within the scope of the invention provided the phosphorous containing reagent is also included and said reagent provides some useful morphological or physical property enhancing benefit to such blend.

One of ordinary skill in the art can readily mix the various excipients according to the teachings herein in various ratios and include 5 wt. % or less of the phosphorous containing reagent such as a sodium hypophosphite and determine the morphological or physical property enhancing effects.

The differential scanning calorimeter (DSC) cooling exotherm can easily and quickly be determined and is a useful indicator of morphology and the sufficiency of mixing conditions for the desired morphology. The DSC cooling exotherm will differ depending on the nylon used, but can easily be determined by one skilled in the art. Preferably, the DSC cooling exotherm when using nylon 6 should be 160° C. to 180° C. when cooling is carried out at a rapid rate (e.g. 30° C./min.). The presence of this exotherm indicates that the desired phase relationship has been achieved.

Tensile tests are also useful indicators of the product morphology. When the morphology is correct, the ratio of Tensile at Break ($T_B$) at room temperature (23° C.) to $T_B$ at elevated temperature (150° C.) preferably is less than about 10.

Molded parts of the blend of the present invention made using standard injection molding techniques exhibit high gloss and improved mar resistance without the need of light graining. Without light graining, these molded parts exhibiting DOI's of at least 80 and as high as 90 to 95. Solid and metallic colors can be incorporated and parts can be painted. The high temperature properties of the blend are sufficient to permit OEM Painting of molded parts without the need for special jigs or hangers to maintain part shape during the bake step.

The molded parts of blends of this invention with the addition of standard UV stabilizers for both ionomer and polyamide exhibit surprising weatherability, particularly stability when exposed to ultraviolet light for extended periods of time. These molded parts exhibit the low color shift, measured using, for example, the CIE 1976 (CIE LAB) color scale, needed for molded parts used in exterior applications. They exhibit ΔE color shift values of less than about 3 (a level considered as suitable for exterior automotive applications) when exposed to 2500 kilojoules/square meter in a Xenon-arc weatherometer (SAE J1960). Improved automobile fascia having DOI of at least 80 and superior mar resistance can be made from the blend of this invention.

For applications such as automobile fascia (bumpers, for example), a mar resistance greater than that inherent in some commercial resins is needed. Thus, when using, for example, a BEXLOY®W resin available from E.I. DuPont de Nemours and Company, a light grain is typically applied to the surface of the resin to enhance mar resistance. Any graining, however light and glossy, substantially retards the "Distinctness of Image" (DOI), a key index used to evaluate the perceived quality of an exterior finish in the automotive industry. DOI, a measure of the "crispness" or "degree of definition" of a reflection of a object in a colored finish compared to the actual object itself, is measured from the angle of reflection of a light beam from a spherical surface. DOI can be measured by a Hunterlab Model No. D47R-6F Doigon Gloss Meter. The test panel is placed on the instrument sensor and the sharpness of the reflected image is measured. Details of the DOI test procedure are described in GM Test Specification TM-204-M. In the automotive industry, satisfactory finishes on a smooth or "Class A" surface typically will have a finish with a DOI value of at least 60, preferably 80 or higher.

While still retaining other important performance characteristics, the present invention satisfies a need for higher gloss (at least a value of 60 when measured at 20°, and at least 75 when measured at 60°) and higher DOI (at least 60), faster processing, better high temperature properties, and improved mar resistance without the need of light graining. Also, there is a need for being able to incorporate metallic colors and, alternatively, to be able to paint the molded part, higher gloss, faster processing, better high temperature properties, and improved mar resistance without the need of light graining have been attained. The need for glass fiber reinforcement has been eliminated.

Molded parts made using the blends of this invention have high gloss exhibiting DOI's at least comparable to the best of paint finishes on smooth or "Class A" surfaces, particularly DOI's over 80 and as high as 90 to 95. Solid and metallic colors can be incorporated and parts can be painted. High temperature properties are sufficient to permit OEM Painting without the need for special jigs or hangers to maintain part shape during the bake step. The molded parts with the addition of standard UV stabilizers and both neutralized copolymer, polyamide and hypophosphite exhibit good weatherability, particularly stability when exposed to ultraviolet light for extended periods of time. Improved automobile fascia having DOI of at least 80 and superior mar resistance can be made from the blend of this invention.

Test Methods

1) Vicat Softening Point

The ASTM for the VICAT softening point measurement is ASTM 1525. The Vicat is a measure of the upper end temperature capability ( the point at which the material "softens"). It is different from a heat distortion temperature (HDT) in that the HDT has an imposed load to bear during the heating cycle. The Vicat is a needle like probe and the tip will penetrate the surface when the softening point is reached.

Low Vicat values mean that the material will not be suitable for temperatures around and above the Vicat value. In the present invention, the presence of the hypophosphite surprisingly raises the Vicat—this is due to a change in morphology. When nylon is the continuous phase material we get a high Vicat since nylon has a high melt temperature, high softening point. When a neutralized ethylene/acid copolymer is the continuous phase the Vicat is low—these neutralized ethylene copolymers generally have a low melting point.

Tensile Strength

The tensile values reflect the same relationship between continuous phase material and the material strength at elevated temperature as the Vicat values. 150° C. is selected because it is much higher that the neutralized ethylene acid copolymer melting point. Therefore, differentiation between continuous phase materials based on tensile strength is possible.

Tests on the injection molded test specimens (disks or plaques, as the case might be) reported in the examples were Tensile at Break (ASTM D1708) and Elongation at Break (ASTM D1708) at 23° C. and 150° C., and flexural modulus (ASTM D790A) at 23° C.

The specimen morphologies were also examined with Transmission Electron Microscopy (TEM). Very thin section samples of the specimens were microtomed at cryogenic temperatures in both the machine direction (parallel to flow) and the transverse direction (perpendicular to flow). The samples were stained with phosphotungstic acid which attaches to the nylon component and increases contrast of the transmission picture (ionomer appears lighter and the nylon darker in the high magnification photographs).

Gloss was measured using a Novo-Gloss Meter at 60° angle (black standard=93.64).

EXAMPLES

Except as otherwise indicated, mixing in each of the examples was in a five-heating-zone, 28 mm twin-screw extruder optionally equipped with a Kenics Company static mixer between the tip of the extruder and a single hole die plate. The extruder in each case was operated at a screw speed of 200 revolutions per minute (rpm) with the vacuum port run at about 630 mm mercury vacuum with ingredients fed at a rate of about 10 pounds per hour to the rear feed zone of the extruder. A nitrogen blanket was maintained on the feed hopper. The temperature profile across the length of the extruder was: Throat, about 25° C.; Zone 1, 220° C.; Zones 2, 3, 4, and 5, 250° C.; Adapters 1 and 2, 250° C.; and Die, 265° C. Residence time for the samples was about 2.5 minutes. Samples were quenched in a water bath (about 23° C.) prior to cutting into pellets.

Except as otherwise indicated, the samples in each case were injection molded on a 6 ounce capacity injection molding machine using a general purpose screw with barrel temperature set to achieve melt temperatures in the 260° C. range. Molding conditions employed were fast ram forward speed, 60 rpm screw speed, 50 pounds per square inch gauge (psig) back pressure, 400–800 psig injection pressure, 20 second (sec.) injection time, 30 sec. hold time, and 5/32 inch nozzle.

Standard additive/stabilizer packages were used in each case. The preferred packages include stabilizers for both nylon and ionomer. The package, for example, may include various components as discussed above including, for example, IRGANOX®, TINUVIN®, and CHIMMASORB® stabilizers.

The neutralizing agent concentrates used in these examples are blends of the principle neutralizing agent (e.g. zinc oxide in the ZnO Concentrate and magnesium hydroxide in the MgO Concentrate) in an ethylene/low (5 to 10) wt. % methacrylic acid copolymer carrier made under conditions that assure insignificant neutralization of the carrier. The Concentrate may also contain low levels (up to 2 wt. %) metal salts such as acetates and stearates. The "percent" indicated with respect to the concentrate is the weight percent (based on total weight of concentrate) of the principle neutralizing agent in the concentrate. That is, the 50% MgO Concentrate used in the examples contains 50 wt. % (based on total weight of concentrate) magnesium oxide in an ethylene/5 wt. % methacrylic acid copolymer. The 30% ZnO Concentrate contains 30 wt. % (based on total weight of concentrate) zinc oxide in an ethylene/5 wt. % methacrylic acid copolymer and the 45% ZnO Concentrate contains 45 wt. % (based on total weight of concentrate) zinc oxide in an ethylene/10 wt. % methacrylic acid copolymer.

The following examples demonstrate the mechanical property effects when a hypophosphite such as NaH2PO2 is incorporated into blends of polyamide and a neutralized acid containing copolymer. Table 2 below provides the example numbers, compositions and the relative weight percentages of each component. Tables 3 and 4 provide the Vicat and tensile values for the examples and comparative examples that do not have the phosphorous containing additive. The examples clearly demonstrate significant relative performance in those blends having less than or equal to 40 wt. % polyamide.

Examples 1–4 describe the preparation of four blends having 40 to 33 wt. % polyamide with 0.2 wt. % hypophosphite. Relatively high Vicat softening points and tensiles at 150° are obtained (see Tables 3 and 4 below). Tables 3 and 4 also provide this data for the Comparative examples C1–C4. In general, a surprising 4 to 10× improvement in high temperature tensile was observed when NaH2PO2 was incorporated. Vicat softening points increase from the mid-80° C. range to the 130° to 180° C. range. The present invention therefore relates to a method of increasing high temperature tensile and Vicat softening points in polyamide blends comprising adding the phosphorous containing reagents described herein to said blends. In particular, the improvement or increase is seen in polyamide/high- acid-containing-polymer blends.

Example 1

40 wt. % nylon-6 was combined with 50 wt. % SUR-LYN® 9120, 6.2 wt. % ZnO concentrate, 1.7 wt. % zinc stearate, 1.9 wt. % UV and Thermal Stabilizers and 0.2 wt. % sodium hypophosphite and fed to the back portion of a 28 mm twin screw extruder (see above text for general mixing conditions). The extrudate strand was chopped into pellets, dried and optionally combined with colorant via a pellet/pellet mix. The mix was added to a 6 oz injection molding to produce test bars and plaques (see above for general molding machine conditions).

Example 2

35 wt. % nylon-6 was combined with 52.4 wt. % SUR-LYN® 9120, 8.8 WT. % ZnO concentrate, 1.7 wt. % zinc stearate, 1.9 wt. % UV and Thermal Stabilizer Package and 0.2 wt. % sodium hypophosphite and fed to the back portion of a 28 mm twin screw extruder (see above for general mixing conditions). The extrudate strand was chopped into pellets, dried and optionally combined with colorant via a pellet/pellet mix. The mix was added to a 6 oz injection molding to produce test bars and plaques (see above for general molding machine conditions).

Example 3

33 wt. % nylon-6 was combined with 53.8 wt. % SUR-LYN® 9120, 9.4 wt. % ZnO concentrate, 1.7 wt. % zinc stearate, 1.9 wt. % UV and Thermal Stabilizers and 0.2 wt. % sodium hypophosphite and fed to the back portion of a 28 mm twin screw extruder (see above for general mixing conditions). The extrudate strand was chopped into pellets, dried and optionally combined with colorant via a pellet/pellet mix. The mix was added to a 6 oz injection molding to produce test bars and plaques (see above for general molding machine conditions). Example 4

40 wt. % nylon-6 was combined with 49 wt. % SUR-LYN® 9120, 6.2 wt. % ZnO concentrate, 1.7 wt. % zinc stearate, 2.9 wt. % UV and thermal stabilizers and 0.2 wt. % sodium hypophosphite and fed to the back portion of a 28 mm twin screw extruder (see above for general mixing conditions). The extrudate strand was chopped into pellets, dried and optionally combined with colorant via a pellet/pellet mix. The mix was added to a 6 oz injection molding to produce test bars and plaques (see above for general molding machine conditions).

Comparative Examples C1–C4

Examples C1–C4 were prepared according to the procedures delineated above for examples 1–4 except that in each case no sodium hypophosphite was added. The processing procedures and molding conditions were also identical to those described above.

TABLE 2

| EX # | nylon wt. % | neutralized acid polymer wt. % | ZnO wt. %[1] | ZnStearate wt. % | UV and Thermal Package wt. % | hypophosphite wt. % |
|---|---|---|---|---|---|---|
| 1 | 40 | 50 | 6.2 | 1.7 | 1.9 | 0.2 |
| 2 | 35 | 52.4 | 8.8 | 1.7 | 1.9 | 0.2 |
| 3 | 33 | 53.8 | 9.4 | 1.7 | 1.9 | 0.2 |
| 4 | 40 | 49 | 6.2 | 1.7 | 2.9 | 0.2 |

[1]ZnO concentrate.

TABLE 3

| Example | Vicat Softening Point, °C. |
|---|---|
| 1 | 167.4 |
| 2 | 144.8 |
| 3 | 132.2 |
| 4 | 178.6 |
| Comparative Example | |
| C1 | 82.9 |
| C2 | 84.2 |
| C3 | 82.9 |
| C4 | 86.9 |

TABLE 4

| | Tensile Strength 23° C. kg/cm2(psi) | Tensile Strength 150° C. kg/cm2(psi) | 23/150° C. Tensile Ratio |
|---|---|---|---|
| Example | | | |
| 1 | 457.35(6505) | 86.12(1225) | 5.3 |
| 2 | not measured* | 74.52(1060) | 5.9 |
| 3 | 441.39(6278) | 54.13(770) | 8.2 |
| 4 | 467.54(6650) | 100.53(1430) | 4.7 |
| Comp. Example | | | |
| C1 | 394.28(5608) | 9.00(128) | 43.8 |
| C2 | 399.48(5682) | 10.54(150) | 37.9 |
| C3 | 376.56(5356) | 5.83(83) | 64.5 |
| C4 | 407.85(5801) | 22.50(320) | 18.1 |

*assuming 457 kg/cm2 (6500 psi)

The morphological properties of the blends of the examples are consistent with a polyamide continuous phase or co-continuous phase having the neutralized ethylene copolymer dispersed therein.

These examples are considered to be non-limiting and one of ordinary skill in the art can vary the blend percentages and the individual components as taught generically or specifically herein to arrive at polymeric blends having improved morphological properties as a result of the phosphorous containing additive. The present invention is thus directed to a method of using a hypophosphite to improve the morphological properties of a polyamide blend comprising adding a morphological improving effective amount of the hypophosphite to the polyamide blend. The preferred wt. % of the phosphorous containing compound based upon the total weight of the ingredients in the blend is 2 percent or less.

What is claimed is:
1. A polyamide composition comprising:
 (a) a polyamide present in an amount of (i) 40 weight percent or less if component (b) is an acid-containing polymer or a neutralized version thereof, or (ii) from 25 to 40 weight percent if component (b) includes a second polyamide;

(b) at least one additional polymer selected from a second polyamide, and an acid-containing polymer or a neutralized version thereof; and (c) about 3 weight percent or less of a phosphorous-containing compound wherein the phosphorous-containing compound enhances the morphology of the composition, and wherein the total amount of polyamide in the composition is 40 weight percent or less.

2. The composition according to claim 1 wherein the at least one additional polymer is an acid-containing-polymer or a neutralized version thereof.

3. The composition according to claim 2 wherein the polyamide is present in an amount of from 30 to 40 weight percent and is selected from a semi-crystalline polyamide, an amorphous polyamide or a blend thereof.

4. The composition according to claim 2 wherein the acid-containing-polymer is selected from an alkylene based polymer or copolymer having a carboxylic acid moiety or neutralized version thereof in the backbone of the polymer or grafted to the backbone of the polymer.

5. The composition according to claim 4 wherein the carboxylic acid moiety is neutralized with a metal salt to form a neutralized acid-containing-polymer.

6. The composition according to claim 5 wherein the neutralized acid-containing-polymer is selected from an ethylene copolymer or terpolymer having a neutralized or partially neutralized carboxylic acid moiety in the backbone of the polymer.

7. The composition according to claim 6 wherein the ethylene copolymer or terpolymer is selected from a compound of the formula: E/X/Y and/or E/Y wherein E is ethylene; X is a softening comonomer and Y is an α,β-ethylenically-unsaturated $C_3$–$C_8$ carboxylic acid and wherein the relative weight percentage of Y is about 15 to 25 weight %.

8. The composition according to claim 1 wherein the phosphorous-containing-compound is selected from a phosphorus acid or a salt thereof wherein the salt has an anion and at least one cation.

9. The composition according to claim 8 wherein the anions are selected from the group of anions consisting of: phosphate having a minus 3 charge, phosphite having a minus 2 charge, hypophosphite having a minus 1 charge, diphosphonite with a minus 2 charge, pyrophosphorite with a minus 4 charge, triphosphoric acid anion with a minus 5 charge, hypodiphosphoric acid anion with a minus 4 charge, or blends thereof.

10. A molded or extruded part comprising the blend according to claim 1.

11. A method of enhancing the morphological properties of a polyamide blend having a continuous or co-continuous polyamide phase, comprising the steps:

(1) mixing at least three ingredients selected from (a) a polyamide present in an amount of (i) 40 weight percent or less if component (b) is an acid-containing polymer or a neutralized version thereof, or (ii) from 25 to 40 weight percent if component (b) includes a second polyamide; (b) at least one additional Dolvmer selected from a second polyamide, and an acid-containing polymer or a neutralized version thereof; and (c) about 3 weight percent or less of a phosphorous-containing compound, wherein the phosphorous-containing compound enhances the morphology of the composition, and wherein the total amount of polyamide in the composition is 40 weight percent or less; and, (2) extruding the blend.

12. The method according to claim 11 wherein the polyamide is selected from a semi-crystalline or amorphous polyamide or a blend thereof wherein said polyamide is present in a weight percentage range of 30 to 40%.

13. The method according to claim 11 wherein the additional polymer is selected from an acid containing ethylene copolymer.

14. The method according to claim 13 wherein the acid containing ethylene copolymer is neutralized or partially neutralized.

15. The method according to claim 14 wherein the neutralized or partially neutralized ethylene copolymer is based upon an ethylene/methacrylic acid or acrylic acid copolymer.

16. The method according to claim 14 wherein the percentage of acid monomer in the acid containing ethylene copolymer is between about 15 to about 25 wt. %.

17. The method according to claim 11 wherein the phosphorous containing compound is selected from a hypophosphite or salt thereof.

* * * * *